Jan. 14, 1969    D. R. SELF    3,421,671
PULSE DRIVE SHAFT
Filed Oct. 13, 1966
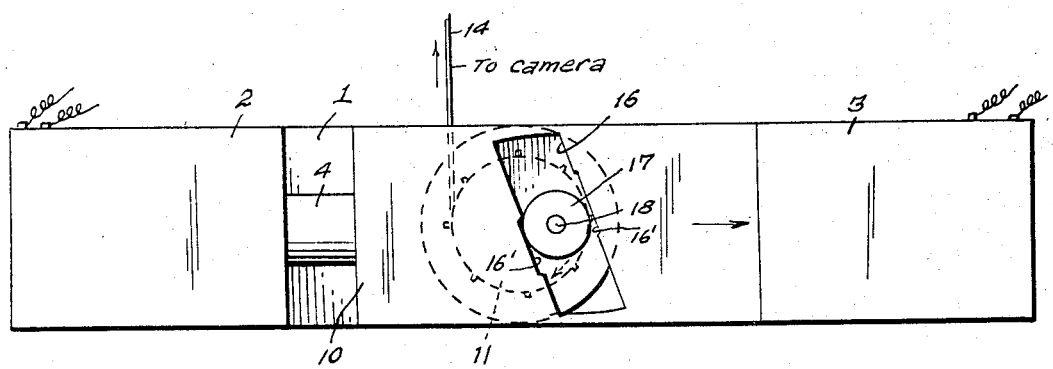
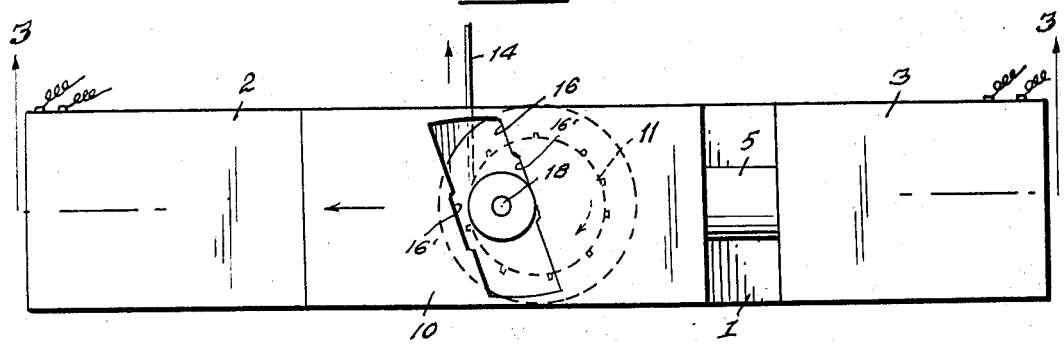
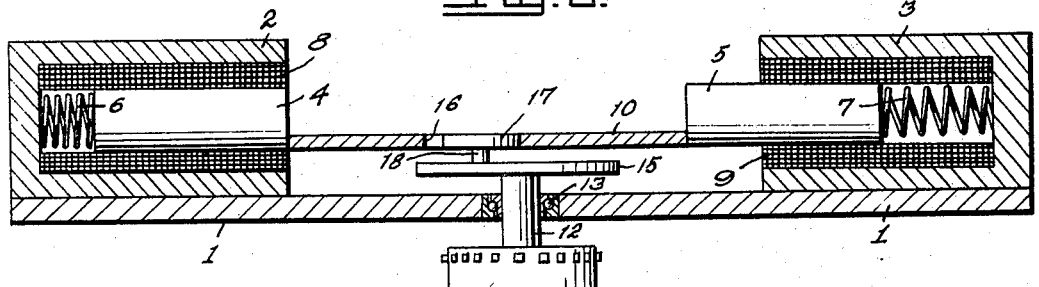
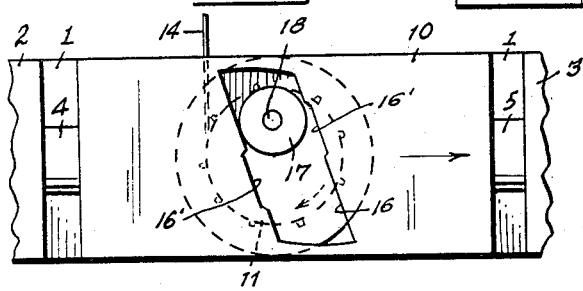
INVENTOR,
Dolty R. Self
BY: Harry M. Saragovitz,
Edward J. Kelly &
Herbert Berl    ATTORNEYS.

United States Patent Office 3,421,671
Patented Jan. 14, 1969

3,421,671
PULSE DRIVE SHAFT
Dolty R. Self, Hatch, N. Mex., assignor to the United States of America as represented by the Secretary of the Army
Filed Oct. 13, 1966, Ser. No. 587,380
U.S. Cl. 226—76     3 Claims
Int. Cl. G03b 1/24; B65h 17/22

ABSTRACT OF THE DISCLOSURE

A drive for a film transport sprocket wherein a solenoid reciprocated means is used to transfer constant direction rotary motion to the sprocket.

---

The invention described herein may be manufactured and used by or for the government, for governmental purposes, without the payment to me of any royalty thereon.

This invention relates to a pulse drive shaft and more particularly to a mechanism for the transfer of motion from an alternating straight pulling motion to a constant direction rotary motion.

The mechanism of the invention is particularly adapted for use in the film transport means of a camera. The basic motion of such means is the moving forward of a measured amount of film into a shutter position, stopped, and then exposed to light by the shutter. Then another measured amount is moved forward for the next exposure.

Previous mechanisms of this type have been extremely complicated; one type, of a mechanical nature, being limited to a fairly slow rate of speed, while another type required an electronic synchronization system, both being subject to either mechanical or electronic deviations.

The present invention eliminates the aforesaid complications by a simplified mechanism consisting of a slide having a slanted slot therein. A pair of opposed solenoids attached, one each, to the slide intermittently moves it in a reciprocating manner. A follower riding in the slot is pivoted on a disc carried by the shaft of a film sprocket. Each movement from side to side results in the sprocket being turned one half a revolution to advance the film for a series of exposures thereon.

The slot in the slide is angularly disposed and therefore eliminates the "dead spot" that would occur if the slot was disposed normal to the longitudinal axis of the slide.

It is a primary object of this invention to provide a mechanism for the transfer of linear motion to a constant direction rotary motion in a film transport system of a camera.

It is another object to provide a mechanism for advancing a film for exposure in a camera having no lost motion in its operation.

A further object is a film advancing mechanism that is extremely simple in operation and of economical construction.

These and other objects and advantages of the present invention will be fully apparent from the following description when taken in connection with the annexed drawing, in which:

FIG. 1 is a top plan view of the device and showing the slide at one end of its travel;

FIG. 2 is a similar view, but showing the slide at the opposite end of its travel whereby the film sprocket is turned one half of a revolution;

FIG. 3 is a longitudinal section taken along line 3—3 of FIG. 2, and,

FIG. 4 is a detail view, the slide being shown midway in its travel when the solenoids are not energized.

Referring to the drawing in detail, reference character 1 designates a mount upon which is supported solenoids 2 and 3 at each end thereof.

Solenoids 2 and 3 are provided with sliding armatures 4 and 5 which are spring biased by coil springs 6 and 7. Electrical windings are indicated by 8 and 9 and when energized electrically retract armatures 4 and 5.

A slide 10 is fixed at each of its ends to armatures 4 and 5, respectively, as best seen in FIG. 3.

A film sprocket 11 is carried by a shaft 12 which is journaled in a bearing 13 in mount 1 and rotates the sprocket 11 for advancing a film 14.

A disc 15 is carried by the upper end of shaft 12 for rotation therewith.

Slide 10 is provided with an angularly disposed slot 16. A follower roller 17 is rotatable on a stub shaft 18, which is carried by disc 15, and rides in slot 16.

Stub shaft 18 is radially offset from the axis of shaft 12 as is shown.

The operation is simple and is as follows:

When solenoids 2 and 3 are not energized, slide 10 will be in the position shown in FIG. 4 due to equal bias of springs 6 and 7.

Assuming now that solenoid 3 is the first one energized, then armature 5 will be attracted within winding 9 and slide 10, being connected thereto will move to the position shown in FIG. 1, and film 14 will advance to position in a camera (not shown) for the first exposure by its shutter (also not shown).

To expose the next picture, solenoid 2 will be energized and solenoid 3 de-energized and armature 4 will be attracted within winding 8 and slide 10 will be moved to the position shown in FIG. 2.

As slide 10 moves to the position shown in FIG. 2 follower 17 will be moved by a wall of slot 16 to rotate disc 15 one half a revolution for advancing film 14 to the distance necessary for the subsequent exposure in the camera.

The solenoids 2 and 3 may be alternately energized and de-energized to repeat the process by means not shown.

Each complete travel of slide 10 from side to side will cause the disc 15 to revolve one half a revolution and the disc 15 will revolve in one direction of rotation only due to the follower 17 riding against the side walls of the slanting slot 16.

While solenoids are shown for moving slide 10, other means could be used, such as mechanical spring-wound motors or even manual operation.

It is obvious that the mechanism would be designed to accommodate film of various sizes by the location of stub shaft 18 relative to the length of travel of slide 10. Speed of the mechanism would also be adjusted to provide frequency of the exposures desired in accordance with the shutter speed of the camera.

Cut-outs 16' in slots 16 assure full movement of slide 10 to its respective solenoid as shown.

Although the mechanism of the invention has been described and shown for use with the film transport system of a camera, it is obvious that it could be used in many other applications.

While only a preferred form of the invention has been shown and described, other forms of the invention are contemplated and numerous changes and modifications may be made therein without departing from the spirit of the invention as set forth in the appended claims.

What is claimed is:

1. A film transporting mechanism for transferring motion from an alternating straight pulling to a constant direction rotation including in combination, a reciprocable member having a slot therein, means fixed on said mount for alternately moving said reciprocable member from side to side, a shaft journaled in said mount and a sprocket mounted on one end of said shaft, a following means mounted on the other end of said shaft and associated with said slot in said reciprocable member, said following means comprising a disc mounted on said shaft journaled in said mount, a stub shaft mounted on said disc in offset relation to its axis and a roller rotatably mounted on said stub shaft and normally riding in said slot in said reciprocable member whereby when said reciprocable member is moved a full travel to either side said sprocket will rotate one half of a revolution to advance a film into a camera for exposure therein.

2. A device as set forth in claim 1 wherein said reciprocable member comprises an elongated flat plate having an angularly disposed slot medially therein for receiving said follower therein, said slot having a cut out portion in each of its side walls, said cut out portions being arranged in offset relation with respect to the medial portion of said walls to assure full movement of said reciprocable member to either side.

3. A device as set forth in claim 1 wherein said means for alternately moving said reciprocable member from side to side comprises a pair of solenoids fixed, one each, on each end of said mount, each said solenoid including a spring loaded armature fixed to an end of said reciprocable member.

References Cited

UNITED STATES PATENTS

| | | | |
|---|---|---|---|
| 491,095 | 2/1893 | Freeman | 74—126 X |
| 2,017,855 | 10/1935 | Foster et al. | 226—76 X |
| 2,419,759 | 4/1947 | Briskin et al. | 74—126 X |
| 2,999,625 | 9/1961 | Lapointe. | |

ALLEN N. KNOWLES, *Primary Examiner.*

U.S. Cl. X.R.

74—126; 226—188